US012005721B2

(12) United States Patent
Hori

(10) Patent No.: US 12,005,721 B2
(45) Date of Patent: Jun. 11, 2024

(54) THERMAL PRINTER

(71) Applicant: TOSHIBA TEC KABUSHIKI KAISHA, Tokyo (JP)

(72) Inventor: Shinya Hori, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 126 days.

(21) Appl. No.: 17/875,323

(22) Filed: Jul. 27, 2022

(65) Prior Publication Data

US 2022/0363082 A1 Nov. 17, 2022

Related U.S. Application Data

(63) Continuation of application No. PCT/JP2021/027541, filed on Jul. 26, 2021.

(30) Foreign Application Priority Data

Aug. 19, 2020 (JP) ................................ 2020-138415

(51) Int. Cl.

| | |
|---|---|
| ***B41J 29/58*** | (2006.01) |
| ***B41J 2/335*** | (2006.01) |
| ***B41J 29/13*** | (2006.01) |
| *B41J 3/407* | (2006.01) |

(52) U.S. Cl.

CPC ............... *B41J 29/58* (2013.01); *B41J 2/335* (2013.01); *B41J 29/13* (2013.01); *B41J 3/4075* (2013.01)

(58) Field of Classification Search

CPC ... B41J 29/58; B41J 2/335; B41J 29/13; B41J 3/4075

See application file for complete search history.

(56) References Cited

U.S. PATENT DOCUMENTS

2015/0314624 A1 11/2015 Harris

FOREIGN PATENT DOCUMENTS

| | | |
|---|---|---|
| JP | H01-145176 A | 6/1989 |
| JP | 2000-203122 A | 7/2000 |
| JP | 2001-18940 A | 1/2001 |

(Continued)

OTHER PUBLICATIONS

English Translation of International Search Report dated Feb. 24, 2022, mailed in counterpart International Application No. PCT/JP2021/027541, 2 pages.

(Continued)

*Primary Examiner* — Justin Seo

(74) *Attorney, Agent, or Firm* — Kim & Stewart LLP

(57) ABSTRACT

A thermal printer of an embodiment includes: a main body; an opening and closing lid; a printing portion that includes a platen and a thermal head; a locking portion locks the opening and closing lid; a detection unit that detects a predetermined pressing state between the thermal head and the platen when a sensor detects a detection target portion; a controller that prohibits printing by the printing portion when the detection unit does not detect the predetermined pressing state; and a biasing member that biases the main body and the opening and closing lid in a direction in which the main body and the opening and closing lid are separated from each other so that the sensor does not detect the detection target portion in a state where the opening and closing lid is not locked to the locking portion.

4 Claims, 5 Drawing Sheets

(56) References Cited

FOREIGN PATENT DOCUMENTS

| | | | | | |
|---|---|---|---|---|---|
| JP | 2004-322429 | A | | 11/2004 | |
| JP | 2004345264 | A | * | 12/2004 | .......... B41J 11/0095 |
| JP | 3800891 | B2 | * | 7/2006 | ............. B26D 1/085 |
| JP | 2013-184340 | A | | 9/2013 | |
| JP | 2018-165028 | A | | 10/2018 | |
| WO | WO-9633914 | A1 | * | 10/1996 | .............. B41J 11/42 |

OTHER PUBLICATIONS

Notice of Reasons for Refusal dated Dec. 12, 2023 mailed in corresponding Japanese Patent Application No. 2020-138415, 10 pages (with English machine translation).

* cited by examiner

THERMAL PRINTER

CROSS-REFERENCE TO RELATED APPLICATIONS

This application is a continuation application of International Application No. PCT/JP2021/027541, filed Jul. 26, 2021, which designates the United States, and which claims the benefit of priority from Japanese Patent Application No. 2020-138415, filed Aug. 19, 2020, the entire contents of which are incorporated herein by reference.

FIELD

An embodiment described herein relates to a thermal printer.

BACKGROUND

Conventionally, there has been known a thermal printer including a main body in which a sheet storage portion having an open upper surface is formed, and an opening and closing lid pivotably provided on the main body to open and close a sheet storage chamber portion. For this type of thermal printer, a thermal printer is widely used in which a platen is provided on a main body and a thermal head is provided on an opening and closing lid, and the thermal head is pressed against the platen in a state where the opening and closing lid is closed to perform printing on a sheet conveyed between the thermal head and the platen.

In the thermal printer having the above configuration, when the thermal head provided on the opening and closing lid is not pressed against the platen provided on the main body with an appropriate pressing force, normal printing cannot be performed, and a printing failure occurs. Such a printing failure may occur when the thermal printer is used in any state other than a state in which, for example, the opening and closing lid closes the sheet storage portion and is locked to the main body (hereinafter, "locked state").

In order to prevent the above printing failure, a configuration is adopted in which a means for detecting that the thermal head and the platen have a predetermined pressing force is provided and printing is prohibited when it is not detected that the thermal head and the platen have the above predetermined pressing force. As means for detecting that the thermal head and the platen have a predetermined pressing force, for example, a configuration is used in which a rib is provided on the opening and closing lid and a sensor for detecting the above rib in the locked state of the opening and closing lid is provided in the main body.

However, with the above conventional configuration, depending on the dimensional accuracy of the rib provided on the opening and closing lid or the mounting accuracy of the sensor provided in the main body, the sensor may detect the rib even in a state where the opening and closing lid is not in the locked state and the thermal head and the platen are not pressed with a predetermined pressing force. As a result, printing is performed while the thermal head is not pressed against the platen with an appropriate pressing force, and a printing failure occurs. Such a situation occurs, for example, in a case where the user does not check the locked state when closing the opening and closing lid after storage of a new sheet in the sheet storage portion. Therefore, it is desired to suppress a printing failure caused by an inappropriate pressing force of the thermal head with respect to the platen.

It is thus preferable to provide a thermal printer capable of suppressing a printing failure caused by an inappropriate pressing force of a thermal head with respect to a platen.

DETAILED DESCRIPTION

A thermal printer of an embodiment includes: a main body that includes a sheet storage portion; an opening and closing lid that is pivotably provided on the main body and can open and close the sheet storage portion; a printing portion that includes a platen provided on one of the main body and the opening and closing lid, and a thermal head provided on an other and contacting or separating from the platen as the opening and closing lid is opened and closed; a locking portion that is provided on the main body and locks the opening and closing lid in a state where the opening and closing lid closes the sheet storage portion; a detection unit that detects a predetermined pressing state between the thermal head and the platen when a sensor provided in one of the main body and the opening and closing lid detects a detection target portion provided on an other; a print control unit that prohibits printing by the printing portion when the detection unit does not detect the predetermined pressing state; and a biasing member that biases the main body and the opening and closing lid in a direction in which the main body and the opening and closing lid are separated from each other so that the sensor does not detect the detection target portion in a state where the opening and closing lid is not locked to the locking portion.

Figure 1:
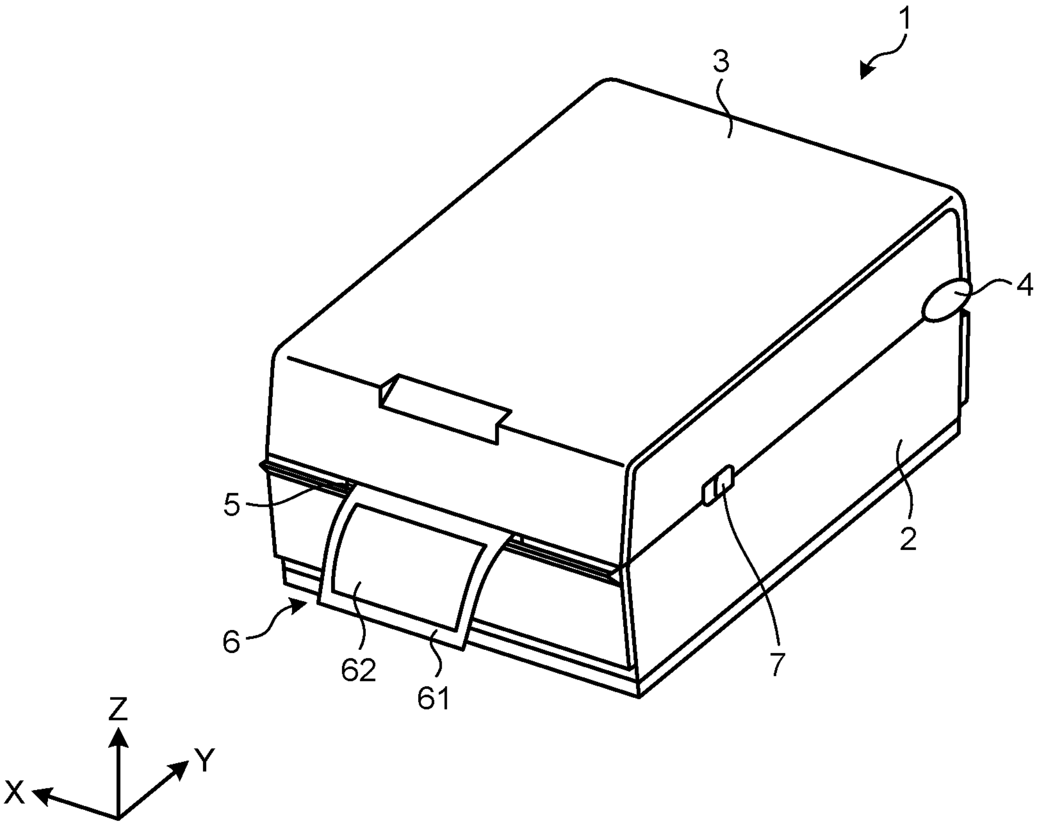
FIG. 1 is a perspective diagram illustrating an external appearance of a thermal printer of an embodiment.
Figure 2:
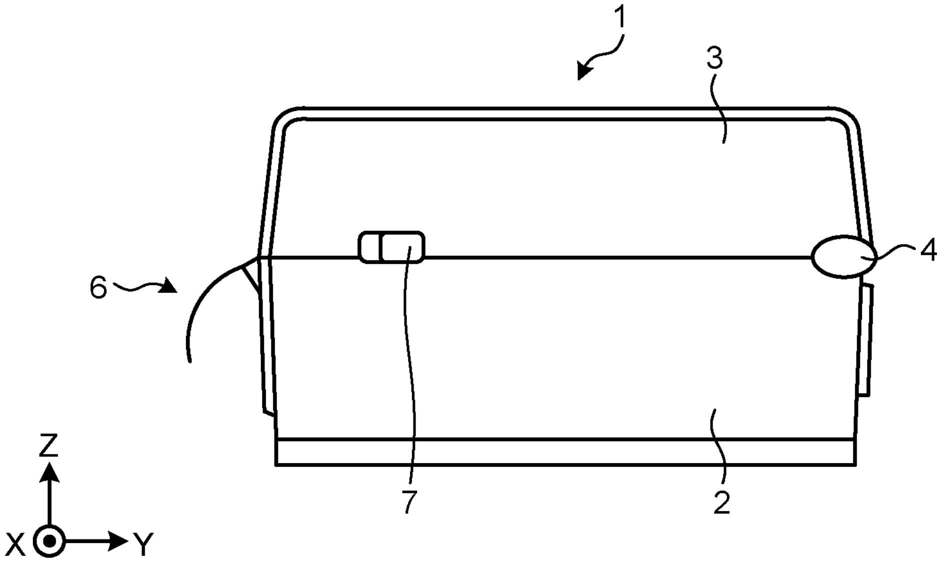
FIG. 2 is a side diagram of a thermal printer of an embodiment.

Hereinafter, a thermal printer of an embodiment will be described with reference to the drawings. FIG. 1 is a perspective diagram illustrating an external appearance of a thermal printer 1, and FIG. 2 is a side diagram illustrating a lateral (X direction) surface (hereinafter, also referred to as a side surface) of the thermal printer 1. The thermal printer 1 is connected to a higher-level device (personal computer (PC) in the present embodiment), which is not illustrated, by wire or wirelessly, and functions as a label printer that receives print data from the PC and performs printing on a label. However, this is an example of a method of using the thermal printer 1, and the thermal printer 1 may be used in other fields.

The thermal printer 1 includes a main body 2 and an opening and closing lid 3. The main body 2 internally includes a sheet storage portion 21 (see FIG. 3) opened upward (Z direction). The main body 2 includes a pair of pivot support portions 4 located at one end on the rear side (Y direction). The opening and closing lid 3 is supported by the pivot support portions 4, and is pivotably provided on the main body 2 so as to open and close the opening of the sheet storage portion 21.

On the front side of the thermal printer 1, a discharge port 5 is formed by the main body 2 and the opening and closing lid 3. The discharge port 5 discharges a printed sheet 6. In the present embodiment, the sheet 6 includes a roll-shaped mount 61 and labels 62 attached to the mount 61 at predetermined intervals. The thermal printer 1 prints, for example, a barcode on the labels 62.

An operator 7 slidable in a front-rear direction is provided on a side surface of the opening and closing lid 3. The operator 7 performs an operation of releasing a state (hereinafter, also referred to as a locked state) in which the opening and closing lid 3 closes the sheet storage portion 21 and is locked to the main body 2. As illustrated in FIGS. 1 and 2, the operator 7 is located on the rear side in the locked state of the opening and closing lid 3, and releases the locked state by sliding to the front side.

Figure 3:
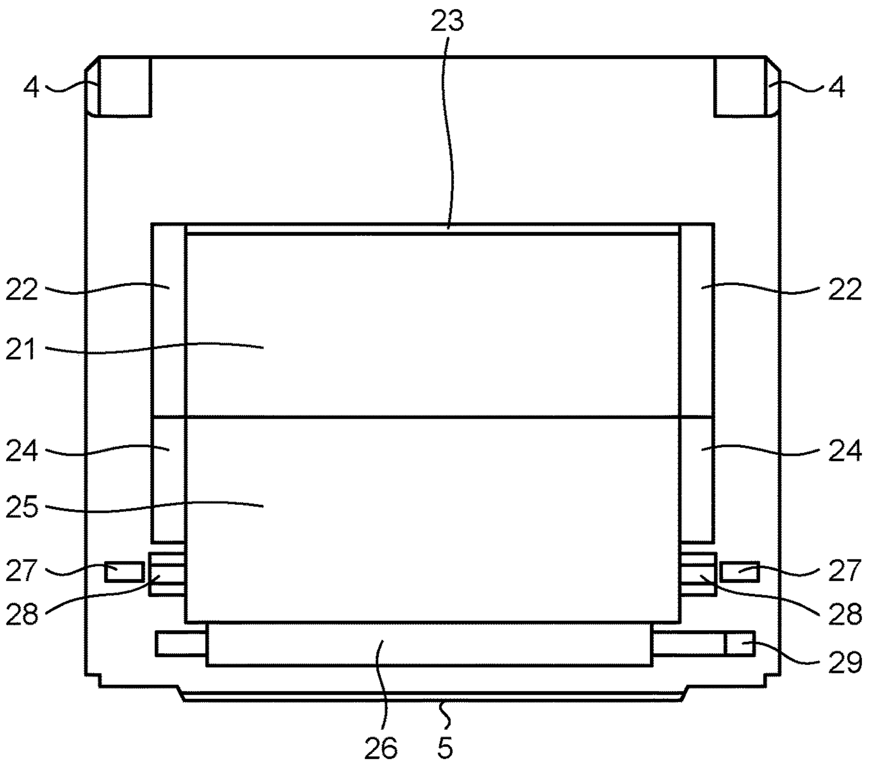
FIG. 3 is a plan diagram illustrating an internal configuration of a main body of a thermal printer of an embodiment.

FIG. 3 is a plan diagram of the main body 2 as viewed from above. The main body 2 includes the sheet storage portion 21, a pair of side walls 22, a lower rear wall 23, a pair of lower guide walls 24, a conveyance path 25, a platen 26, a pair of hooks 27, a pair of sensors 28, and a lifter 29.

The sheet storage portion 21 stores a sheet 6 having a roll shape. The sheet storage portion 21 is formed in a recessed shape recessed downward by the pair of side walls 22 and the lower rear wall 23 protruding from the bottom surface of the main body 2. The pair of lower guide walls 24 is provided continuously with the pair of side walls 22, and guides a conveyed sheet 6 toward the discharge port 5. The conveyance path 25 is formed by the pair of lower guide walls 24 and the like, and is a conveyance pathway of the sheet 6 from the sheet storage portion 21 to the discharge port 5.

The platen 26 is rotatably provided at a front end of the main body 2. The platen 26 includes a roller extending in a both-side direction, and rotates as a drive source using a conveyance motor to be described below. The platen 26 sandwiches the sheet 6 with a thermal head 35 (see FIG. 4) provided on the opening and closing lid 3, and rotates in this state to convey the sheet 6.

The pair of hooks 27 is provided on both sides of the conveyance path 25. Details of the hooks 27 will be described below, and the hooks 27 detachably lock lock levers provided on the opening and closing lid 3. The hooks 27 are an example of a locking portion that locks the opening and closing lid 3.

The pair of sensors 28 is provided between the conveyance path 25 and the respective hooks 27. Each sensor 28 detects a rib 36 (see FIG. 4) provided on the opening and closing lid 3 in the locked state of the opening and closing lid 3. Each sensor 28 may be provided on the opening and closing lid 3, and in this case, a detection target member such as a rib is provided on the main body 2. Further, the number of sensors 28 to be provided is not necessarily plural, but may be one. However, by providing the sensors 28 in the vicinity of both ends of the platen 26 as in the present embodiment, it is possible to detect that the thermal head 35 is appropriately pressing the platen 26 over the entire width. Note that details of the sensors 28 will be described below.

The lifter 29 is located at a front end portion of the main body 2 (end portion opposite to the pivot support portions 4 in the front-rear direction) and on a straight line in a direction in which the platen 26 extends, and is provided only on one side of the platen 26. The lifter 29 includes a coil spring 291 (see FIG. 6). The coil spring 291 can expand and contract in an up-down direction, and pushes up the opening and closing lid 3 against the weight of the opening and closing lid 3 when the opening and closing lid 3 is not in the locked state. Further, when the opening and closing lid 3 is in the locked state, the coil spring 291 is pressed and compressed by the opening and closing lid 3. The coil spring 291 is an example of a biasing member that biases the main body 2 and the opening and closing lid 3 in a direction in which the main body 2 and the opening and closing lid 3 are separated from each other, and may be provided on the opening and closing lid 3. Note that a plurality of coil springs 291 may be provided on both sides of the platen 26 or the like. However, by providing only on one side as in the present embodiment, it is possible to suppress a reduction in operability when the user closes the opening and closing lid 3. This is because when the user closes the opening and closing lid 3, it is necessary to push down the opening and closing lid 3 against the biasing force of the coil spring 291, and thus the operation force for bringing the opening and closing lid 3 into the locked state can be reduced by providing only on one side. Note that details of the lifter 29 will be described below.

Figure 4:
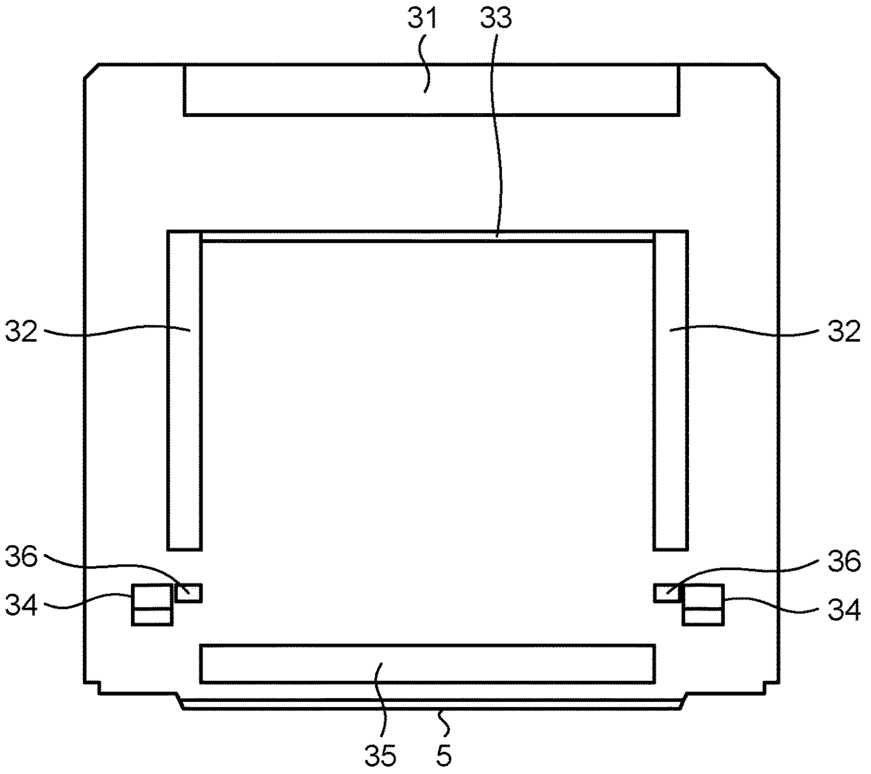
FIG. 4 is a plan diagram illustrating an internal configuration of an opening and closing lid of a thermal printer of an embodiment.

FIG. 4 is a plan diagram of the opening and closing lid 3 as viewed from below. The opening and closing lid 3 includes a pivot shaft 31, a pair of upper guide walls 32, an upper rear wall 33, a pair of lock levers 34, the thermal head 35, and a pair of ribs 36.

Both ends of the pivot shaft 31 are pivotably supported by the pivot support portions 4 included in the main body 2. Thus, the opening and closing lid 3 is pivotably attached to the main body 2. The pair of upper guide walls 32 contacts or comes close to the pair of side walls 22 and the pair of lower guide walls 24 formed on the main body 2 in the locked state of the opening and closing lid 3. The upper rear wall 33 contacts or comes close to the lower rear wall 23 in the locked state of the opening and closing lid 3.

That is, in the locked state of the opening and closing lid 3, the pair of side walls 22 and the lower rear wall 23 formed on the main body 2, and the pair of upper guide walls 32 and the upper rear wall 33 formed on the opening and closing lid 3 form a sheet storage space for storing the sheet 6 in the thermal printer 1. Further, in the locked state of the opening and closing lid 3, the pair of lower guide walls 24 provided on the main body 2 and the pair of upper guide walls 32 provided on the opening and closing lid 3 form a sheet conveyance space communicating with the sheet storage space in the thermal printer 1.

The pair of lock levers 34 is provided to be located in front of the pair of upper guide walls 32. Each of the lock levers 34 is detachably locked to each of the hooks 27 provided on the main body 2. The lock levers 34 and the hooks 27 constitute a locking mechanism that locks the opening and closing lid 3 to the main body 2. Note that details of the locking mechanism will be described below.

The thermal head 35 is provided to be located at a front end portion of the opening and closing lid 3. The thermal head 35 is a line thermal head in which a plurality of heating elements is provided on a line along a direction orthogonal to the conveyance direction of the sheet 6. Further, the thermal head 35 is pressed against the platen 26 with a predetermined pressing force via the sheet 6 in the locked state of the opening and closing lid 3. The thermal head 35 causes the above heating elements to generate heat in a state where the sheet 6 is held between the thermal head 35 and the platen 26, and applies thermal energy to the label 62 of the sheet 6 to print a barcode or the like on the label 62. The thermal head 35 and the platen 26 constitute a printing portion.

The pair of ribs 36 is provided to be located on an inner side of the pair of lock levers 34. Each of the ribs 36 enters the detection region of the sensor 28 provided in the main body 2 in the locked state of the opening and closing lid 3. The ribs 36 are detected by the sensors 28, and are an example of a detection target portion. The sensors 28 and the ribs 36 constitute a detection mechanism for detecting a predetermined pressing state between the thermal head 35 and the platen 26. It can also be said that this detection mechanism is a detection mechanism that detects the locked state of the opening and closing lid 3. Note that details of the detection mechanism will be described below.

Figure 5:
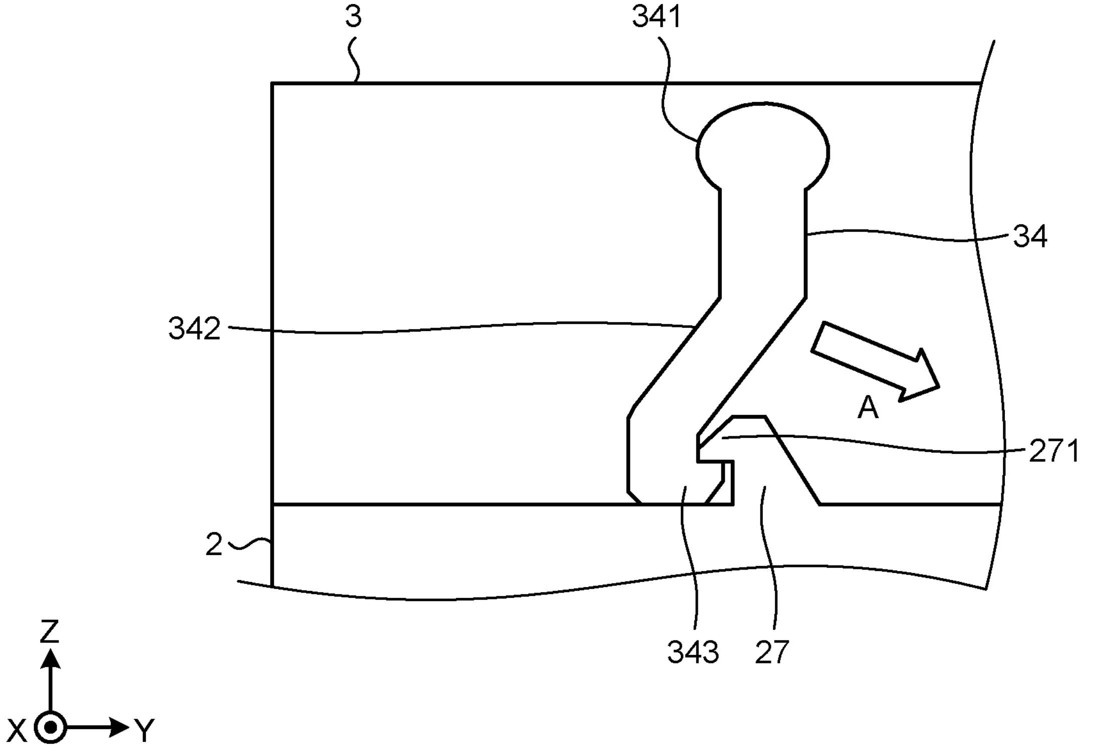
FIG. 5 is a diagram schematically illustrating an outline of a locking mechanism of a thermal printer of an embodiment.

FIG. 5 is a diagram schematically illustrating an outline of the locking mechanism. The lock lever 34 provided in the opening and closing lid 3 includes a support portion 341, an arm portion 342, and a locking claw 343.

The support portion 341 is supported by the opening and closing lid 3. The support portion 341 functions as a pivot shaft of the lock lever 34 pivotably supported by the opening and closing lid 3. The arm portion 342 couples the support portion 341 and the locking claw 343. The locking claw 343 is formed in an L shape, and is detachably locked to the hook 27 provided on the main body 2.

The lock lever 34 is constantly biased in an arrow A direction by a spring, which is not illustrated. In order to bring the opening and closing lid 3 into the locked state, the opening and closing lid 3 is pivoted in the closing direction about the pivot support portions 4 of the main body 2. Then, the locking claw 343 contacts an inclined surface portion 271 formed on the upper surface of the hook 27. When the locking claw 343 is pressed against the inclined surface portion 271, the lock lever 34 pivots in the direction opposite to the arrow A direction against the biasing force of the spring. When the opening and closing lid 3 is further pivoted in the closing direction, the locking claw 343 slides down the inclined surface portion 271, and the locking claw 343 is locked to the hook 27 as illustrated in FIG. 5. Thus, the opening and closing lid 3 is in the locked state. Note that the operator 7 provided on the side surface of the opening and closing lid 3 is interlocked with the lock lever 34 via an interlocking mechanism, which is not illustrated, and is located closer to the rear side in the locked state of the opening and closing lid 3.

When the opening and closing lid 3 is opened from the state illustrated in FIG. 5, for example, when a new sheet 6 is stored in the sheet storage portion 21, the user slides the operator 7 provided on the side surface of the opening and closing lid 3 to the front side. When the operator 7 slides to the front side, the lock lever 34 interlocking with the operator 7 pivots in the direction opposite to the arrow A direction against the biasing force of the spring. Thus, the locking between the locking claw 343 and the hook 27 is released, and the locked state of the opening and closing lid 3 is released, so that the user can open the opening and closing lid 3. Note that, in the present embodiment, one operator 7 is configured to interlock with the two lock levers 34, but the operators 7 interlocked with the respective lock levers 34 may be separately provided.

Figure 6:
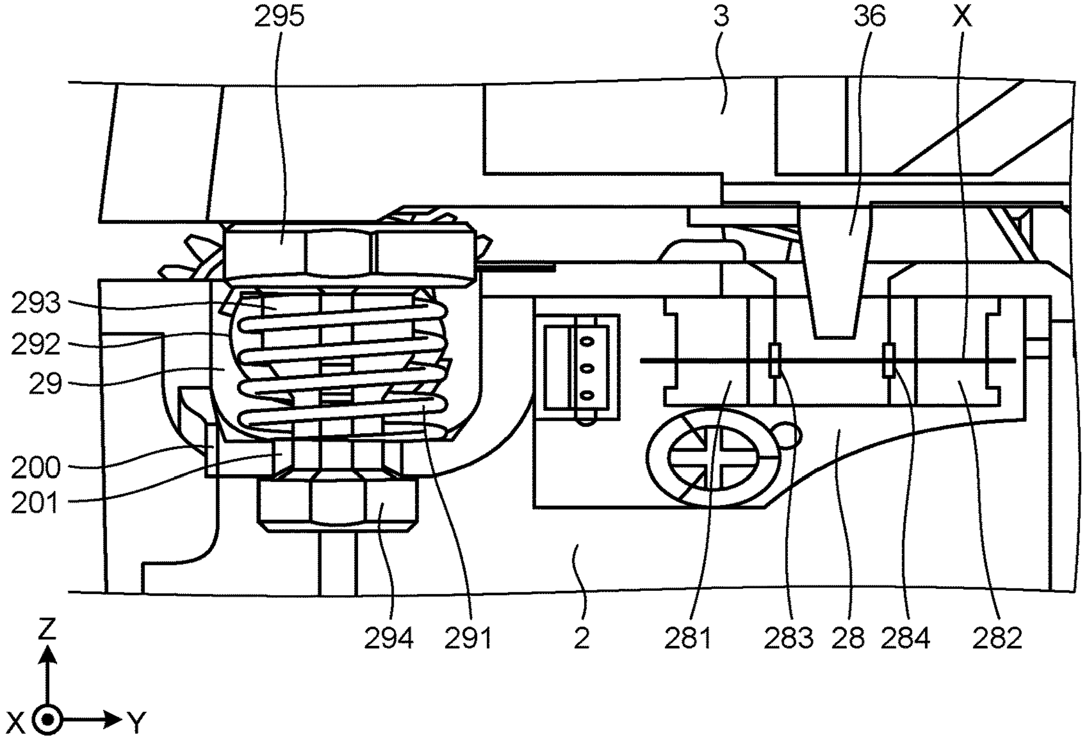
FIG. 6 is a diagram illustrating a biasing member and a sensor of a thermal printer of an embodiment and illustrating a state in which the sensor does not detect a detection target portion.
Figure 7:
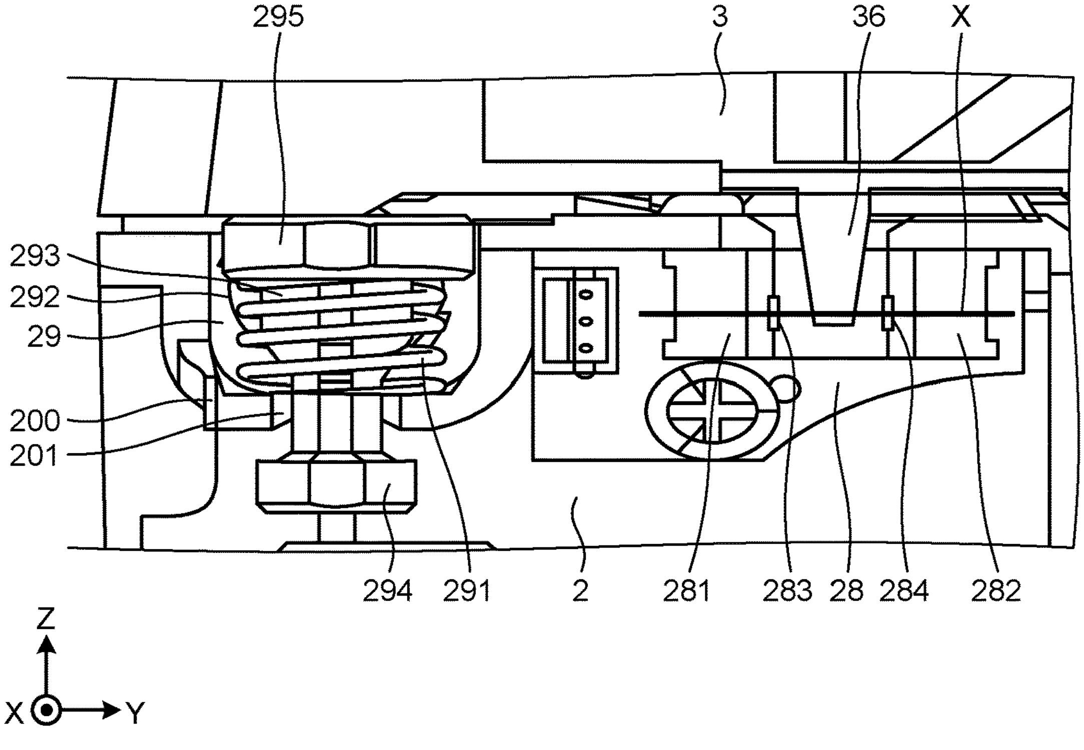
FIG. 7 is a diagram illustrating a biasing member and a sensor of a thermal printer of an embodiment and illustrating a state in which the sensor detects a detection target portion.

Next, the detection mechanism for detecting the locked state of the opening and closing lid 3 will be described. FIG. 6 is a diagram illustrating the lifter 29 and the detection mechanism and illustrating a case where the opening and closing lid 3 is not in the locked state. FIG. 7 is a diagram similarly illustrating the lifter 29 and the detection mechanism and illustrating a case where the opening and closing lid 3 is in the locked state.

The sensors 28 detect the presence or absence of the ribs 36, which are detection target portions, provided on the opening and closing lid 3. The sensor 28 is a widely known optical sensor, and includes a front wall portion 281, a rear wall portion 282, a light emitting portion 283, and a light receiving portion 284. The front wall portion 281 and the rear wall portion 282 are attached to the main body 2. The front wall portion 281 and the rear wall portion 282 are formed to be separated from each other by a predetermined distance in the front-rear direction, and the sensor 28 can receive the rib 36 provided on the opening and closing lid 3 between the front wall portion 281 and the rear wall portion 282.

The light emitting portion 283 is provided on the front wall portion 281 and emits light rearward. The light receiving portion 284 is provided on the rear wall portion 282 and receives the light from the light emitting portion 283. The sensor 28 detects the presence or absence of the rib 36 provided on the opening and closing lid 3 depending on whether or not the light receiving portion 284 receives the light from the light emitting portion 283. Specifically, it is detected whether or not the rib 36 is located on a detection line X between the light emitting portion 283 and the light receiving portion 284.

As illustrated in FIG. 6, when the rib 36 is not located on the detection line X, the light receiving portion 284 receives the light from the light emitting portion 283. The sensor 28 outputs a corresponding output signal to a control unit 50 (see FIG. 8). The control unit 50 detects that the opening and closing lid 3 is not in the locked state, in other words, the thermal head 35 and the platen 26 are not in a predetermined pressing state, on the basis of the output signal from the sensor 28. On the other hand, as illustrated in FIG. 7, when the opening and closing lid 3 is in the locked state, the rib 36 is located on the detection line X and blocks the light from the light emitting portion 283, so that the light receiving portion 284 does not receive the light. The sensor 28 outputs a corresponding output signal to the control unit 50. The control unit 50 detects that the opening and closing lid 3 is in the locked state, in other words, the thermal head 35 and the platen 26 are in a predetermined pressing state on the basis of the output signal from the sensor 28.

The lifter 29 is closely provided in the front-rear direction of the thermal printer 1. The lifter 29 is attached to a pedestal portion 200 provided in the main body 2, and includes the coil spring 291 and a movable element 292.

The coil spring 291 is wound around the movable element 292 and is provided such that a lower end contacts the pedestal portion 200. When the opening and closing lid 3 is not in the locked state, the coil spring 291 biases the main body 2 and the opening and closing lid 3 in a direction in which the main body 2 and the opening and closing lid 3 are separated from each other such that the sensor 28 does not detect the rib 36. Specifically, the coil spring 291 pushes up the opening and closing lid 3 against the weight of the opening and closing lid 3 when the opening and closing lid 3 is not in the locked state. The coil spring 291 is an example of a biasing member.

The movable element 292 includes a columnar portion 293, a lower surface portion 294, and an upper surface portion 295.

The columnar portion 293 penetrates a through-hole 201 formed in the pedestal portion 200. Further, the coil spring 291 is wound around the columnar portion 293.

The lower surface portion 294 is provided to be coupled to the lower end of the columnar portion 293, and is formed to have a shape having a diameter larger than that of the through-hole 201 of the pedestal portion 200. When the movable element 292 is pushed up by the coil spring 291, the lower surface portion 294 contacts the pedestal portion 200 to restrict the upward movement of the movable element 292.

The upper surface portion 295 is provided to be coupled to the upper end of the columnar portion 293 and is provided to be exposed on the upper surface of the main body 2. Further, the upper surface portion 295 is formed to have a shape having a diameter larger than that of the coil spring 291, and an upper end portion of the coil spring 291 contacts the upper surface portion 295. Therefore, an upward biasing force is applied to the upper surface portion 295 by the coil spring 291.

The coil spring 291 has a resilient force capable of pushing up the opening and closing lid 3 so that the rib 36 is not located on the detection line X when the opening and closing lid 3 contacts the upper surface portion 295 and the weight of the opening and closing lid 3 is applied to the lifter 29. That is, when the opening and closing lid 3 is closed but is not in the locked state, as illustrated in FIG. 6, the opening and closing lid 3 contacts the upper surface portion 295 of the movable element 292, and the weight of the opening and closing lid 3 is applied to the lifter 29, but the opening and closing lid 3 is pushed up by the biasing force of the coil spring 291, and the rib 36 is not located on the detection line X.

On the other hand, when the user pushes down the opening and closing lid 3 from this state, the coil spring 291 is compressed between the pedestal portion 200 and the upper surface portion 295. Then, when the locking claw 343 of the lock lever 34 is locked to the hook 27 and the opening and closing lid 3 is in the locked state, the rib 36 descends to the detection line X as illustrated in FIG. 7.

Figure 8:
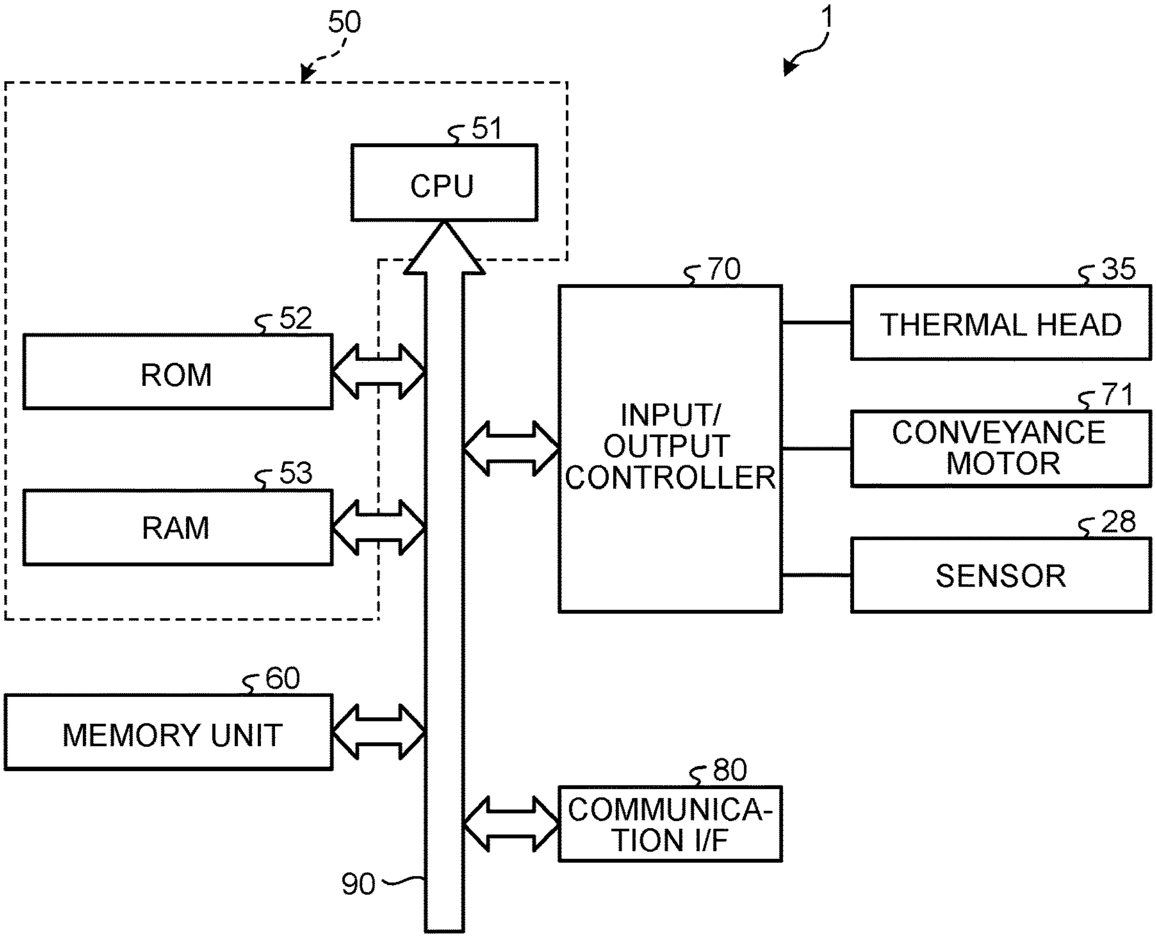
FIG. 8 is a block diagram illustrating a hardware configuration of a thermal printer of an embodiment.

Next, FIG. 8 is a block diagram illustrating a hardware configuration of the thermal printer 1. The thermal printer 1 includes the control unit 50, a memory unit 60, an input/output controller 70, a communication interface (I/F) 80, and the like. The control unit 50, the memory unit 60, the input/output controller 70, and the communication I/F 80 are connected to each other via a bus 90.

The control unit 50 includes a computer including a central processing unit (CPU) 51, read only memory (ROM) 52, and random access memory (RAM) 53. The CPU 51, the ROM 52, and the RAM 53 are connected to each other via the bus 90.

The CPU 51 controls the entire operation of the thermal printer 1. The ROM 52 stores various programs such as programs used to drive the CPU 51 and various data. The RAM 53 is used as a work area of the CPU 51, and loads various programs and various data stored in the ROM 52 or the memory unit 60. The control unit 50 executes various control processing of the thermal printer 1 by the CPU 51 operating according to a control program stored in the ROM 52 or the memory unit 60 and loaded on the RAM 53.

The memory unit 60 includes, for example, a hard disk drive (HDD), a solid state memory (SSD), or the like. The memory unit 60 stores various control programs and the like in addition to the control program for functioning as the thermal printer 1.

The input/output controller 70 is connected to the thermal head 35, a conveyance motor 71, and the sensors 28. The input/output controller 70 has a function as an input/output interface for connected hardware and a function for controlling the hardware. Thus, the control unit 50 can transmit and receive information (data) to and from the thermal head 35, the conveyance motor 71, and the sensors 28 via the input/output controller 70, and can control these pieces of hardware on the basis of an instruction from the control unit 50.

The communication I/F 80 is an interface for connection with an external device, and is connected to a PC, which is a higher-level device. Thus, the control unit 50 can transmit and receive information (data) to and from the PC via the communication I/F 80.

Figure 9:
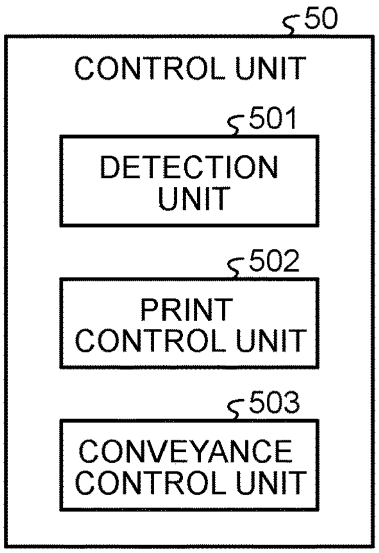
FIG. 9 is a block diagram illustrating a functional configuration of a thermal printer according to an embodiment.

Next, a functional configuration of the control unit 50 of the thermal printer 1 will be described. FIG. 9 is a block diagram illustrating an example of a functional configuration of the control unit 50. The control unit 50 functions as a detection unit 501, a print control unit (controller) 502, and a conveyance control unit 503 by the CPU 51 operating according to the control program stored in the ROM 52 or the memory unit 60. Note that each of these functions may be configured by hardware.

The detection unit 501 detects a predetermined pressing state between the thermal head 35 and the platen 26 by the sensors 28 provided in one of the main body 2 and the opening and closing lid 3 detecting the detection target portions provided on the other. Specifically, the detection unit 501 detects that the thermal head 35 and the platen 26 are in a predetermined pressing state by receiving a signal indicating that the ribs 36 provided on the opening and closing lid 3 are detected from both of the sensors 28 provided in the main body 2. Since the thermal head 35 and the platen 26 are in a predetermined pressing state when the opening and closing lid 3 is in the locked state, it can be said that the detection unit 501 detects the locked state in which the lock levers 34 of the opening and closing lid 3 are locked to the hooks 27 of the main body. Further, the detection unit 501 detects that the thermal head 35 and the platen 26 are not in a predetermined pressing state by receiving a signal indicating that the rib 36 is not detected from at least one of the sensors 28.

The print control unit 502 controls the thermal head 35 on the basis of a print instruction and print data received from the PC via the communication I/F 80, and performs printing on, for example, the label 62. Further, when the detection unit 501 does not detect the predetermined pressing state between the thermal head 35 and the platen 26, the print control unit 502 prohibits printing by the thermal head 35. Specifically, when the detection unit 501 detects that the thermal head 35 and the platen 26 are not in the predetermined pressing state, the print control unit 502 does not start printing before printing the print data, and stops printing during printing.

The conveyance control unit 503 controls the conveyance motor 71 on the basis of a print instruction and print data received from the PC via the communication I/F 80. Further, when the detection unit 501 does not detect the locked state of the opening and closing lid 3, the conveyance control unit 503 stops the conveyance motor 71.

The operation of the thermal printer 1 will be described on the basis of the above configuration. When the opening and closing lid 3 is locked, as illustrated in FIG. 7, the opening and closing lid 3 presses the upper surface portion 295 of the lifter 29, bringing the coil spring 291 into a compressed state. Therefore, both sensors 28 detect the ribs 36, and the detection unit 501 detects the locked state of the opening and closing lid 3. The print control unit 502 controls the thermal head 35 to print the print data received from the PC on the basis of the detection result of the detection unit 501. Further, the conveyance control unit 503 also controls the conveyance motor 71 according to the above printing. At this time, since the opening and closing lid 3 is in the locked state, the thermal head 35 is pressed against the platen 26 with an appropriate pressing force to perform printing, and thus favorable printing is executed.

For example, when the sheet 6 is used up, the user slides the operator 7 provided on the opening and closing lid 3 to the front side. Then, the lock levers 34 pivot in the direction opposite to the arrow A direction of FIG. 5 in conjunction with the sliding operation of the operator 7, the locking claws 343 of the lock levers 34 and the hooks 27 are unlocked, and the locked state of the opening and closing lid 3 is released. The user pivots the opening and closing lid 3 to open the sheet storage portion 21 and stores a new sheet 6 having a roll shape.

Subsequently, the user pivots the opening and closing lid 3 to close the sheet storage portion 21. At this time, the user may not notice that the lock levers 34 are not locked to the hooks 27, that is, the opening and closing lid 3 is not in the locked state. In this case, as illustrated in FIG. 6, the coil spring 291 of the lifter 29 biases the opening and closing lid 3 upward, in other words, in a direction away from the main body 2 with a predetermined biasing force against the weight of the opening and closing lid 3. Therefore, the sensors 28 provided in the main body 2 do not detect the ribs 36 provided on the opening and closing lid 3, and the detection unit 501 detects that the opening and closing lid 3 is not in the locked state, that is, the thermal head 35 and the platen 26 are not in a predetermined pressing state. The print control unit 502 controls the thermal head 35 to prohibit printing on the basis of the detection result of the detection unit 501. Note that the thermal printer 1 may include a notification unit that notifies that the opening and closing lid 3 is not in the locked state by, for example, display, sound, or the like.

When the user recognizes that the opening and closing lid 3 is not in the locked state, the user pushes down the opening and closing lid 3. The opening and closing lid 3 pushes down the upper surface portion 295 of the lifter 29, and the coil spring 291 is compressed between the pedestal portion 200 and the upper surface portion 295. Then, as illustrated in FIG. 5, the locking claw 343 of the lock lever 34 is locked to the hook 27, bringing the opening and closing lid 3 into the locked state. Then, as illustrated in FIG. 7, the sensor 28 provided in the main body 2 detects the rib 36 provided on the opening and closing lid 3, and the detection unit 501 detects that the opening and closing lid 3 is in the locked state. On the basis of the detection result of the detection unit 501, the print control unit 502 controls the thermal head 35 to perform printing on the label, and the conveyance control unit 503 controls the conveyance motor to appropriately convey the sheet 6.

As described above, the thermal printer 1 of the present embodiment employs the configuration in which the sensors 28 provided in one of the main body 2 and the opening and closing lid 3 detect the ribs 36, which are the detection target portions, provided on the other as the configuration for detecting the predetermined pressing state between the thermal head 35 and the platen 26. For this reason, for example, there is an advantage that the locked state of the opening and closing lid 3 can be detected without driving the conveyance motor as compared with a case where the locked state of the opening and closing lid 3 is detected by detecting the rotation of the platen.

Further, the thermal printer 1 of the present embodiment includes the lifter 29 having the coil spring 291 that biases the main body 2 and the opening and closing lid 3 in a direction in which the main body 2 and the opening and closing lid 3 are separated from each other such that the sensors 28 do not detect the ribs 36 when the opening and closing lid 3 is not in the locked state. In more detail, the biasing force of the coil spring 291 is set so that the ribs 36 do not reach the detection line X of the sensors 28 even when the weight of the opening and closing lid 3 is applied to the lifter 29. Therefore, since the sensors 28 are prevented from detecting the ribs 36 when the opening and closing lid 3 is not in the locked state, it is possible to suppress that printing is performed when the thermal head 35 and the platen 26 are not in a predetermined pressing state. Thus, it is possible to suppress a printing failure caused by an inappropriate pressing force of the thermal head 35 with respect to the platen 26.

Furthermore, in the thermal printer 1 of the present embodiment, the lifter 29 having the coil spring 291 is provided on the main body 2, not on the opening and closing lid 3. Therefore, when the opening and closing lid 3 is opened and closed, the lifter 29 does not protrude and retract from the opening and closing lid 3 due to the centrifugal force caused by the pivot of the opening and closing lid 3, and the opening and closing operation of the opening and closing lid 3 can be performed favorably.

Further, according to the present embodiment, the main body 2 pivotably supports the opening and closing lid 3 on one end side (rear end side in the front-rear direction), and the lifter 29 having the coil spring 291 is provided to be located on the other end side (front end side in the front-rear direction) of the main body 2. Therefore, the coil spring 291 can push up the opening and closing lid 3 against the weight of the opening and closing lid 3 with a small biasing force when the opening and closing lid 3 is not in the locked state.

Moreover, according to the present embodiment, the lifter 29 having the coil spring 291 is provided at a position close to the sensor 28 in a state where the opening and closing lid 3 closes the sheet storage portion 21. Therefore, when the opening and closing lid 3 is not in the locked state, the sensor 28 and the rib 36 can be unfailingly separated. For example, when the distance between the sensor 28 and the lifter 29 is large, such as when the lifter 29 is provided close to the pivot support portions 4, the influence of the variation in mounting accuracy of the lifter 29 and the like on the detection of the rib 36 by the sensor 28 increases, but in the present embodiment, the above influence can be suppressed. Thus, it is possible to more unfailingly suppress a printing failure caused by an inappropriate pressing force of the thermal head 35 with respect to the platen 26.

In addition, according to the present embodiment, the sensors 28 are provided on each of both sides of the platen 26 in the extending direction of the platen 26, and the detection unit 501 detects a predetermined pressing state between the thermal head 35 and the platen 26 when both of the sensors 28 detect the ribs 36. Therefore, the detection unit 501 can detect that the thermal head 35 is appropriately pressing the platen 26 over the entire width. Further, the lifter 29 having the coil spring 291 is provided only on one side of the platen 26 in the extending direction of the platen 26. Therefore, the biasing force of the lifter 29 can be reduced as compared with a case where the lifter 29 is provided to correspond to each of the sensors 28. Therefore, the operation force when the user brings the opening and closing lid 3 into the locked state can be reduced, and the locking operation of the opening and closing lid 3 can be facilitated.

Although the embodiment of the present invention has been described above, the embodiment is presented as an example, and there is no intension to limit the scope of the invention. This embodiment can be implemented in various other forms, and various omissions, substitutions, and changes can be made without departing from the gist of the invention. The embodiment and modifications thereof are included in the scope and gist of the invention, and are included in the invention described in the claims and the scope of equivalents thereof.

What is claimed is:

1. A thermal printer comprising:

a main body that includes a sheet storage portion;

an opening and closing lid that is pivotably provided on the main body and can open and close the sheet storage portion;

a printing portion that includes a platen provided on one of the main body and the opening and closing lid, and a thermal head provided on the other of the main body or the opening and closing lid, and contacting or separating from the platen as the opening and closing lid is opened and closed;

a locking portion that is provided on the main body and locks the opening and closing lid in a state where the opening and closing lid closes the sheet storage portion;

a detection unit that detects a predetermined pressing state between the thermal head and the platen when a sensor provided in one of the main body and the opening and closing lid detects a detection target portion provided on the other of the main body or the opening and closing lid;

a controller that prohibits printing by the printing portion when the detection unit does not detect the predetermined pressing state; and a biasing member that biases the main body and the opening and closing lid in a direction in which the main body and the opening and closing lid are separated from each other so that the sensor does not detect the detection target portion in a state where the opening and closing lid is not locked to the locking portion, wherein the sensor is provided on each of both sides of the platen in an extending direction of the platen, the detection unit detects a predetermined pressing state between the thermal head and the platen when both of the sensors detect the detection target portions, and the biasing member is provided on one side of the platen in the extending direction of the platen.

2. The thermal printer according to claim 1, wherein the biasing member is provided in the main body.

3. The thermal printer according to claim 1, wherein the main body pivotably supports the opening and closing lid on one end side, and the biasing member is located on the other end side of the main body in a state where the opening and closing lid closes the sheet storage portion.

4. The thermal printer according to claim 1, wherein the biasing member is closer to the sensor than is to a rotation support portion of the main body in a state where the opening and closing lid closes the sheet storage portion.

* * * * *